(12) United States Patent
Bravo Trinidad

(10) Patent No.: US 10,292,414 B1
(45) Date of Patent: May 21, 2019

(54) APPARATUS AND METHOD FOR FRUIT DECAPPING

(71) Applicant: AGROBOT INC., Wilmington, DE (US)

(72) Inventor: Juan Bravo Trinidad, Wilmington, DE (US)

(73) Assignee: AGROBOT INC., Wilmington, DE (US)

( * ) Notice: Subject to any disclaimer, the term of this patent is extended or adjusted under 35 U.S.C. 154(b) by 0 days.

(21) Appl. No.: 15/892,109

(22) Filed: Feb. 8, 2018

(51) Int. Cl.
| | | |
|---|---|---|
| *A23N 15/04* | (2006.01) | |
| *A23N 15/02* | (2006.01) | |
| *B26D 3/26* | (2006.01) | |
| *B25J 11/00* | (2006.01) | |
| *B25J 18/00* | (2006.01) | |
| *A47J 21/00* | (2006.01) | |
| *A01D 46/30* | (2006.01) | |
| *A01D 47/00* | (2006.01) | |
| *A01D 23/04* | (2006.01) | |
| *B26D 5/08* | (2006.01) | |
| *B26D 5/12* | (2006.01) | |

(52) U.S. Cl.
CPC .......... *A23N 15/02* (2013.01); *A01D 23/04* (2013.01); *A01D 46/30* (2013.01); *A01D 47/00* (2013.01); *A23N 15/04* (2013.01); *A47J 21/00* (2013.01); *B25J 11/0045* (2013.01); *B25J 11/0055* (2013.01); *B25J 18/00* (2013.01); *B26D 3/26* (2013.01); *B26D 5/086* (2013.01); *B26D 5/12* (2013.01); *B26D 2210/02* (2013.01); *Y10S 901/22* (2013.01); *Y10S 901/41* (2013.01)

(58) Field of Classification Search
CPC .......... A23N 15/02–15/04; A47J 21/00; B25J 18/00; B25J 11/0055; B25J 11/0045; B26D 3/26; B26D 5/12; B26D 5/086; B26D 2210/02; A01D 23/00–23/06; A01D 46/30; A01D 47/00; Y10S 901/22; Y10S 901/41
USPC .............................. 426/518, 809, 484, 481; 56/121.04–121.46; 99/635–643
See application file for complete search history.

(56) References Cited

U.S. PATENT DOCUMENTS

| | | | | |
|---|---|---|---|---|
| 1,551,057 | A * | 8/1925 | Robinson ............. | A01D 46/247 30/131 |
| 3,552,108 | A * | 1/1971 | Kattan et al. .......... | A01D 46/00 56/328.1 |
| 4,122,766 | A * | 10/1978 | Ledebuhr ............... | A23N 15/02 198/394 |

(Continued)

FOREIGN PATENT DOCUMENTS

| | | |
|---|---|---|
| CN | 102686119 | 9/2012 |
| GB | 2377161 | 1/2003 |
| WO | 2014144268 | 9/2014 |

*Primary Examiner* — Drew E Becker
(74) *Attorney, Agent, or Firm* — Billion & Armitage; Michael A. Collins

(57) ABSTRACT

A fruit decapping apparatus and method, particularly suited for strawberries. The fruits items (100) are placed by a robotic arm (200) in a lateral aperture (310) of a plate (300), leaving the calyx (120) and the main body (130) below the plate (300). When the robotic arm (200) pulls from the peduncle (110), the plate (300) also pulls from an elastic connection (500). This movement is detected by a sensor (600) which activates a pair of blades (800) solidarily disposed under the lateral aperture (310) of the plate (300).

14 Claims, 3 Drawing Sheets

(56) References Cited

U.S. PATENT DOCUMENTS

| | | | |
|---|---|---|---|
| 2006/0150602 A1* | 7/2006 | Stimmann | A01D 46/30 56/10.5 |
| 2011/0252760 A1* | 10/2011 | Bravo Trinidad | A01D 46/30 56/10.2 A |
| 2013/0064950 A1 | 3/2013 | Randazzo | |
| 2016/0050852 A1* | 2/2016 | Lee | A01D 46/30 47/1.44 |
| 2017/0000027 A1* | 1/2017 | Hunt | A01D 46/30 |
| 2018/0153103 A1* | 6/2018 | Bravo Trinidad | A01D 46/30 |

* cited by examiner

APPARATUS AND METHOD FOR FRUIT DECAPPING

FIELD AND OBJECT OF THE INVENTION

The present invention has its application in the field of automated food processing, and especially, in the area of fruit harvesting and decapping, preferably applied to strawberries.

An object of the invention is to provide a technique for carrying out at the same time the fruits harvesting and decapping operations, thereby avoiding the need of additional orientation systems during the decapping process.

Another object of the invention, is to provide a high precision cutting technique assuring that the fruits are cut always at the same height, in order to minimize both fruit waste and taste degradation caused by residual calices.

BACKGROUND

For decades, there has been an increasing trend towards automatization in the fruit and horticultural sectors. Labor-intensive tasks such as fruit recollection and processing have steadily incorporated innovative solutions that reduce the need of manual work. However, there are still some tasks for which current solutions lack enough efficiency and throughput to replace a more traditional approach. For example, automatization becomes particularly challenging when small items need to be handled individually, and when operations need to be applied to a particular area of the fruit item with a certain degree of precision.

This is the case of decapping processes of strawberries (and other fruits and horticultural fruit items with a similar structure), whose calices need to be removed before consumption or incorporation into processed goods such as drinks, jams, yogurts, etc. In order to remove each calyx in an automated system, each piece of previously-retrieved fruit needs to be individually oriented, aligning the calyx with the decapping element (typically some sort of blade in a fixed position). If this alignment is not performed accurately enough, either parts of the calyx may be left within the fruit, affecting its final flavour; or part of the edible main body may be removed, resulting in an unnecessary waste of food. Furthermore, each fruit must be held tightly enough as to maintain its position during retrieval and decapping, but not as tight as to fruit damage in the sensitive fruit skin. Finally, the task of maintaining health regulations and requirements in an automated decapping system is also challenging, both due to accidental contact with un-hygienized surfaces, and to degradation caused by the acid nature of the fluids that are released during the process.

For example, British patent GB 2,377,161 B presents a system for strawberry calyx removal where fruit items are kept in place during decapping by means of pneumatic suction, in order to prevent damaging the fruits. However, this system does not solve the critical task of aligning the fruits, requiring either manual labor or an external automated sorting and orienting system.

In order to perform the aforementioned orientation, some systems rely on automated vision. For example, PCT publication WO 2014/144268 A1 and US 2013/064950 A1 disclose computer-controlled strawberry pre-processing systems based on calyx detection through vision systems. However, after orientation detection, limited control on the fruit positioning is provided, reducing overall accuracy and efficiency.

Furthermore, all known techniques present limitations in their tolerance to shape variations, that is, when the same kind of good presents different shapes, it may result in errors in the visual recognition algorithms and subsequent decapping.

Chinese patent CN 102,686,119 A discloses an alternative approach which automatizes both fruit orientation and decapping. Each piece of fruit is provided through conveying means which hold the strawberry by the stem, hence keeping fruits in an approximately vertical orientation. A pair of rotating circular blades on both sides of the conveying means' path are applied to the upper part of the strawberry main body, severing the inedible part. However, this approach presents some limitations. On one hand, as the stem length may vary from fruit to fruit, the height at which the calyx is cut may also very, resulting in either leaving residual calyx or removing too much edible fruit. On the other hand, the system relies on sharp blades to perform the decapping, resulting in the release of acidic fluids which need to be periodically cleaned from the blades, reducing overall system efficiency.

Therefore, there is still a need for an automated fruit processing apparatus for fruits and horticultural goods, capable of efficiently and accurately removing calices,

SUMMARY

The current invention solves the aforementioned problems by simultaneously harvesting and decapping pieces of fruit, hence circumventing the challenges of orienting previously-retrieved fruits. Furthermore, the movement capabilities of the automated robotic arm used for fruit harvesting are synergically combined with a cutting means triggered by said movements, resulting in improved efficiency and precision.

In a first aspect of the present invention, a fruit decapping apparatus for fruit items, preferably strawberries, having a peduncle, a calyx and a main body, is disclosed. The apparatus comprises:

A conventional automated robotic arm, based on any technology known in the state of the art for horticultural and fruit fruits harvest. The only requirement for the robotic arm is that the fruit item must be held or gripped by its peduncle, so that the fruit item hangs vertically; and that it can be moved at least horizontally and vertically, without damaging said fruit item.

A plate, disposed substantially on a horizontal plane, with at least a lateral aperture at one of its edges, so the robotic arm places the peduncle of each fruit item in the aperture. The plate is preferably rigid and it is connected to a base through one or more elastic connections, which are expanded when the rigid plate is displaced vertically.

the automated robotic arm is adapted to place said peduncle in the lateral aperture leaving the calyx and main body below the plate;

Furthermore, the size of the lateral aperture is adapted to the size of the peduncle, as to prevent the main body of the fruit item to go through said aperture when pulled from the peduncle by the robotic arm. Instead, when said pulling movement happens, the fruit item displaces the rigid plate vertically, held by the elastic connections.

More preferably, the lateral aperture is funnel-shaped. That is, the lateral aperture comprises an opening that is wider than an internal region where the peduncle of the fruit item is placed.

Also preferably, the rigid plate comprises a plurality of auxiliary apertures disposed on at least one edge of the lateral aperture, and typically smaller than said lateral aperture. Instead of decapping the fruit by removing its calyx, in alternative methods only the peduncle is cut out from the fruit. For this alternative method, those auxiliary apertures are used to break the peduncle by laterally pressing the peduncle, inserted in an auxiliary aperture, against the plate until the peduncle breaks. At least one sensor for detecting any relative movement between the rigid plate and the base. Preferably, the at least one sensor is implemented by means of an inductive sensor located at the base, which detects either a movement of a metallic element of the rigid plate, or a movement of the whole rigid plate in case it is fully metallic.

An actuator fixed to the rigid plate, which is triggered by the at least one sensor when the rigid plate is displaced due to the pull of the robotic arm.

Cutting means comprising at least a pair of blades, located under the lateral aperture at a fixed height, and controlled by the actuator. When the actuator is triggered, the blades close tightly against the fruit item region that connects the calyx and the main flesh body. Preferably, when closed, the geometry of the blades and the movement applied by the actuator are adapted as to prevent said blades from fully severing the fruit item. Instead, some fibers of the fruit item are damaged, but the rest remain connected with a vertical alignment. Therefore, the calyx is removed by the movement of the robotic arm as it keeps pulling from the peduncle, instead of by an actual cut. This prevents the acidic fluid of the peduncle from affecting neither the resulting flavor, nor the condition of the blades. Nevertheless, said blades preferably comprise disposable caps to prevent degradation and facilitate cleaning. Note that the use of disposable caps is facilitated by the fact that the blades are used to tightly grip the fruit without cutting it, hence requiring a lesser sharpness than other systems.

In a first preferred option, the actuator is an electrical actuator which rotates the blades. In this scenario, the blades preferably comprise a curved edge, adapted to the rotating movement induced by the actuator. More preferably, the blades comprise an inverted edge at their tip.

In a second preferred option, the actuator is a pneumatic actuator which displaces the blades laterally. In this scenario, the blades preferably comprised a straight edge, adapted to the linear movement induced by the actuator.

A second aspect of the present invention refers to a method for decapping fruit items having a peduncle, a calyx and a main body, such as strawberries. The method comprises:

Retrieving the fruit item by the peduncle by means of an automated robotic arm.

Placing the fruit item in a lateral aperture of a plate (preferably rigid and horizontally arranged), with the same robotic arm used for its retrieval, in such a way that the fruit item hangs vertically, and the calyx and the main body are placed below the plate, and the peduncle passes through the aperture.

Pulling from the peduncle the fruit item, such as the fruit item pulls upwards the rigid plate, which is connected to a base through one or more elastic connections.

Detecting the relative movement between the rigid plate and the base, for example by means of an inductive sensor.

Closing a pair of blades, triggered by the sensor when the movement between the rigid plate and the base is detected. Preferably, the pair of blades is closed up to a point where the blades partially enter the main body of the fruit item, tightly pressing said main body without cutting it. Depending on the particular preferred implementation, the step of closing the pair of blades may comprise either inducing a linear movement through a pneumatic actuator or inducing a rotating movement through an electrical actuator.

With the disclosed apparatus and method, fruit items are retrieved and decapped at the same time, avoiding the need of additional orientation systems at the decapping stage. Furthermore, the disclosed technique is highly precise, assuring that the fruit item is cut always at the same desired position to remove the calix, thereby minimizing fruit waste and taste degradation caused by residual calices. Also, overall efficiency is enhanced by the speed of the cut technique and by the diminution of problematic residues.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION

The preferred embodiments of the invention are described for the case of the fruit items being strawberries. Nevertheless, the apparatus and method of the invention can be applied to any other fruit or horticultural fruit comprising a calyx that needs to be removed before consumption or processing, by adapting the size of the apparatus components and the treatment of the captured images.

Figure 1:
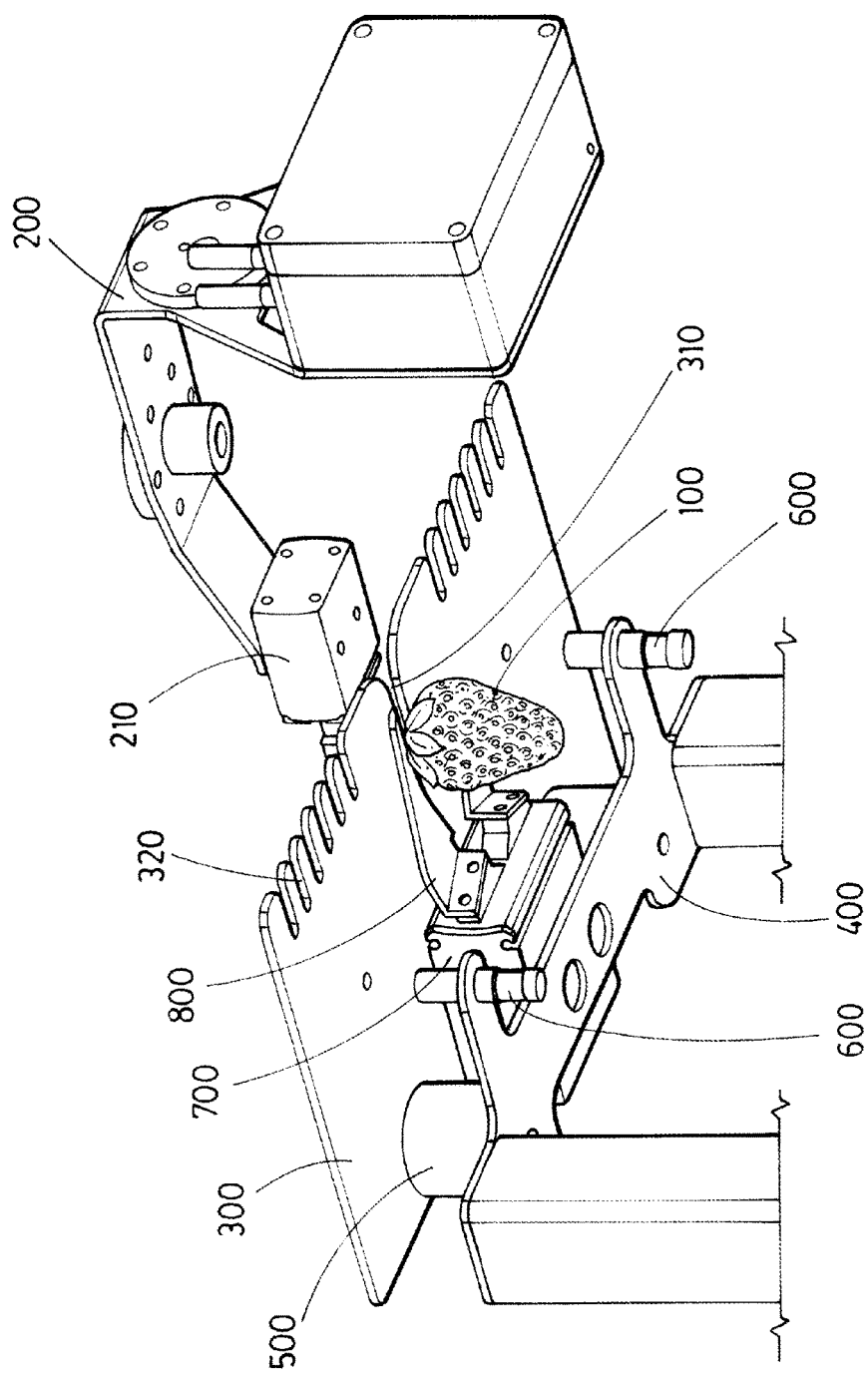
FIG. 1.—shows a perspective view of the fruit decapping apparatus of the invention, according to a preferred embodiment thereof.

FIG. 1 shows a first view of a preferred embodiment of the apparatus of the invention, which implements the steps of a preferred embodiment of the method of the invention. A fruit item (100) to be decapped, such as a strawberry, is also represented to illustrate the apparatus operation. The apparatus comprises a conventional automated robotic arm (200), which retrieves the fruit item (100) by applying a gripper (210) to a peduncle of said fruit item (100). Since fruit decapping is performed at the same location as fruit retrieval, said robotic arm (200) is adapted to any fruit disposition, such as hydroponic arrangements where the fruit items are arranged vertically, or ground plantations where all the calices are arranged towards the center of the plant.

The apparatus further comprises a plate (300) horizontally arranged, and connected to a base (400) through elastic connections (500) which enable small relative displacements in the vertical direction between the plate (300) and the base (400). The plate (300) is preferably rigid and fully or partially metallic.

The elastic connections (500) can be implemented as rubber blocks or springs.

The plate (300) comprises a funnel-shaped lateral aperture (310) at one of its edges, so that, the robotic arm (200) is programmed to place the peduncle (110) of a fruit piece (100) in the aperture (310), so that the calix and main body are placed below the rigid plate (100).

One or more inductive sensors (600) are attached to the base (400), whereas an actuator (700) is attached to the plate (300). The inductive sensors (600) and the actuator (700) are connected through any communication means and communication protocol known in the state of the art, either wired or wireless.

The plate (300) further comprises auxiliary apertures (320) on both sides, in a comb-like structure. Said auxiliary apertures (320) are used to break the peduncle by laterally displacing the robotic arm (200), in those applications where only the peduncle or part of it has to be removed.

Figure 2:
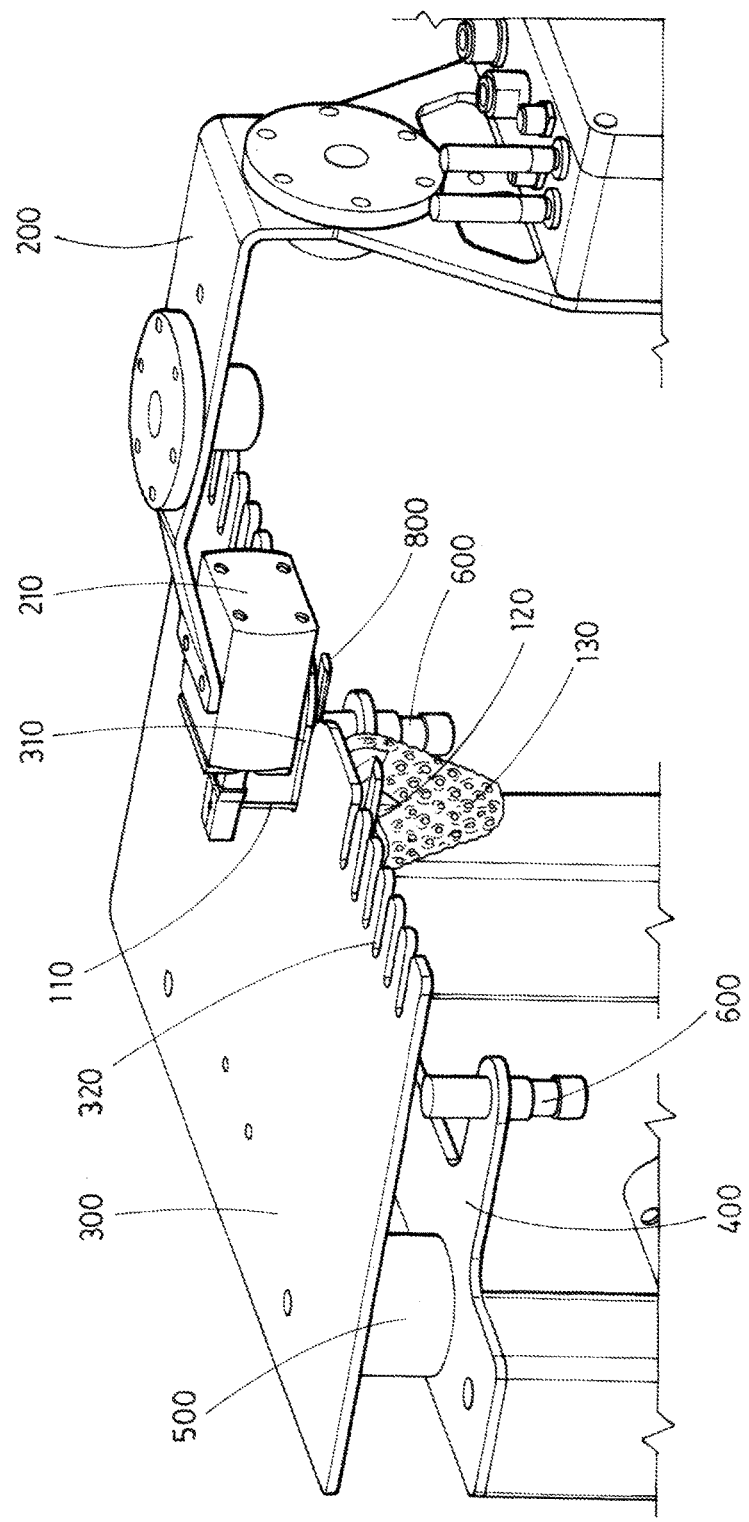
FIG. 2.—shows another perspective view of the fruit decapping apparatus of FIG. 1.

FIG. 2 illustrates with further detail the positioning of the fruit item (100) within the lateral aperture (310) of the plate (300). The fruit item (100) is held at the gripper (210) of the robotic arm (200) by its peduncle (110), and introduced in the lateral aperture (310) leaving the calyx (120) and the main body (130) below the plate (300). Then, the robotic arm (200) pulls vertically from said peduncle (110), so that the main body (130) is pushed against the lower surface of the plate (300) which in turn results in a vertical displacement of the plate (300). The inductive sensor (600) detects said displacement and triggers the actuator (700), which closes the blades against the fruit item, partially entering the main body (130) but without fully cutting it. Since the actuator (700) is attached to the plate (300), it is assured that the piece of fruit is cut always at the same position.

Finally, the robotic arm (200) pulls upwards until the remaining part of the calyx (120) breaks from the main body (130), in this way minimizing the generation of acidic residues.

Figure 3:
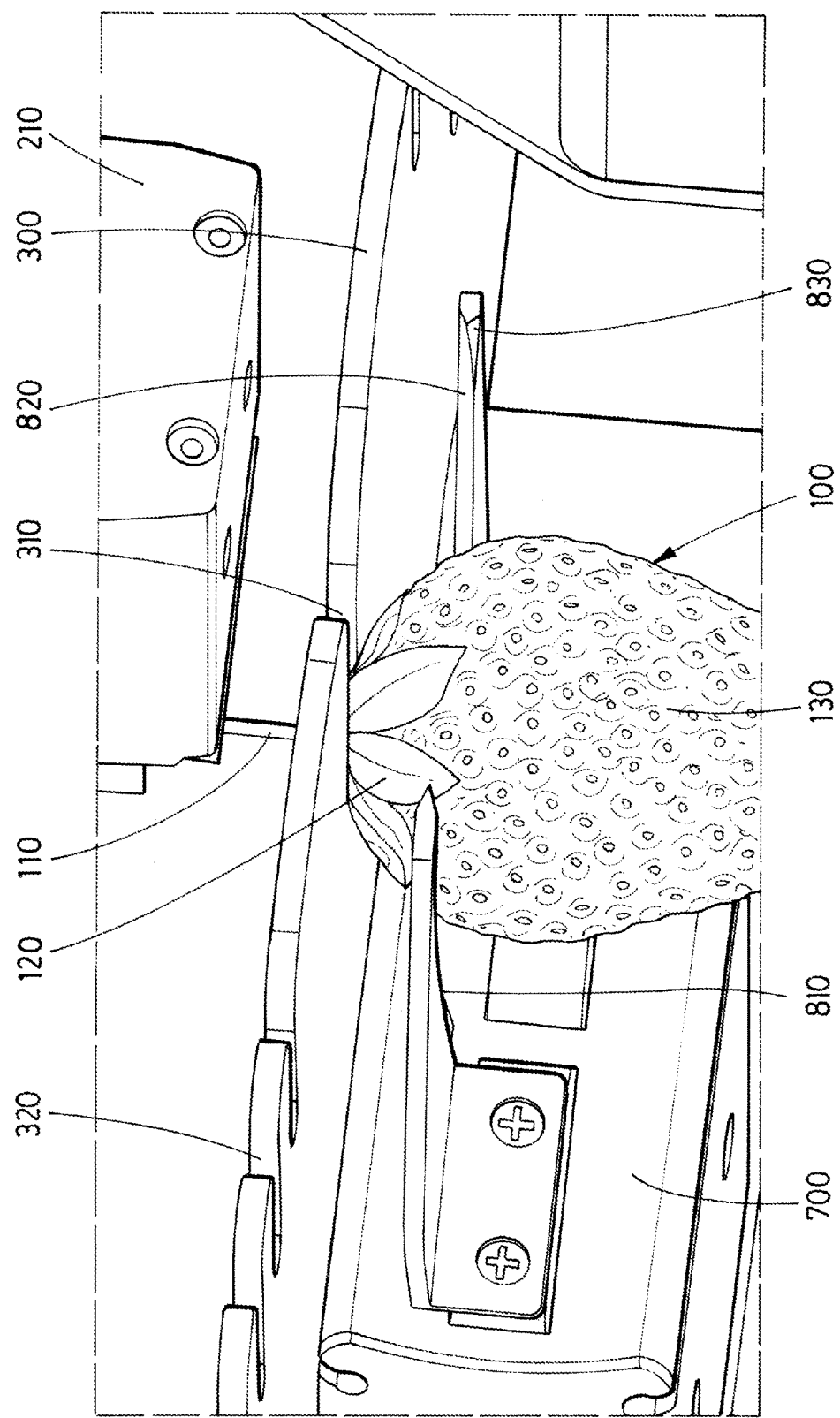
FIG. 3.—shows a third perspective view of the embodiment of FIG. 1, showing in greater detail the blades of the apparatus.

Finally, FIG. 3 shows in greater detail a preferred geometry of the blades (800), in this case comprising a curved edge (810) adapted to a rotating movement induced by the actuator (700). As this movement puts the tips of both blades into contact, said blades (800) comprise an inverted edge (830) at the tip, that is, an edge in the opposite direction as the edge of the main region (820) of the blade (800).

Alternatively, a pneumatic actuator (700) which applies a lateral movement to a pair of straight blades (800) could be used. Furthermore, disposable plastic caps may be applied to the blades to protect them and facilitate their cleaning in order to comply with health regulations.

The invention claimed is:

1. A decapping apparatus for fruits having a peduncle, a calyx and a main body;
   the decapping apparatus comprising:
   a plate horizontally arranged and comprising at least a lateral aperture at one of the plate edges, and wherein the plate is attached to a base through at least one elastic connection, so that the plate is displaceable relative to the base;
   an automated robotic arm adapted to retrieve the fruit by its peduncle and place said peduncle in the lateral aperture leaving the calyx and main body below the plate; and to pull the fruit from its peduncle;
   at least a sensor adapted to detect a relative movement between the plate and the base; and
   cutting means comprising at least one pair of blades adapted to at least partially cut the calix out from the main body when the relative movement is detected.

2. The apparatus of claim 1 wherein the cutting means comprise an actuator adapted to close the at least a pair of blades leaving a distance between said blades which tightly presses the main body of the fruit without cutting said main body.

3. The apparatus of claim 1 wherein the plate is rigid and comprises at least a metallic part, and wherein the at least one sensor is an inductive sensor.

4. The apparatus of claim 1 wherein the actuator is an electrical actuator adapted to induce rotating movement in the at least one pair of blades.

5. The apparatus of claim 4 wherein the at least one pair of blades comprise a curved edge.

6. The apparatus of claim 5 wherein the at least one pair of blades comprise an inverted edge at the tip.

7. The apparatus of claim 1 wherein the actuator is a pneumatic actuator adapted to induce a linear movement in the at least one pair of blades.

8. The apparatus of claim 7 wherein the at least one pair of blades comprise a straight edge.

9. The apparatus of claim 1 wherein the at least one pair of blades comprise disposable caps.

10. The apparatus of claim 1 wherein the at least one lateral aperture further comprises an opening with a wider size than an internal region where the fruits are placed.

11. The apparatus of claim 1 wherein the plate further comprises a plurality of auxiliary apertures disposed on at least one side of the lateral aperture, and wherein the apparatus is further configured to induce a lateral movement between the fruit and the plate.

12. A method of decapping fruits having a peduncle, a calyx and a main body; the method comprising:
   retrieving fruits, by the peduncle with an automated robotic arm;
   placing said fruits in a lateral aperture of a plate, leaving the calyx and the main body below the plate;
   pulling from the peduncle so that the main body is pressed against the plate and the plate is moved,
   detecting the movement of the plate; and
   activating cutting means comprising at least one pair of blades to at least partially cut the calyx when movement of the plate is detected.

13. The method of claim 12, further comprising the step of closing the at least one pair of blades disposed under the plate when the movement of the plate is detected, and wherein the step of closing the at least one pair of blades further comprises tightly pressing the main body of the fruit without cutting said main body.

14. The method of claim 12, wherein the step of closing the at least one pair of blades further comprises inducing a rotating movement through an electrical actuator.

\* \* \* \* \*